(12) United States Patent
Tetsuka et al.

(10) Patent No.: US 8,678,144 B2
(45) Date of Patent: *Mar. 25, 2014

(54) HYDRAULIC CALIPER BRAKE FOR A BICYCLE

(75) Inventors: Toshio Tetsuka, Ashiya (JP); Kenji Nakahara, Kawachinagano (JP)

(73) Assignee: Shimano, Inc., Sakai (JP)

( * ) Notice: Subject to any disclaimer, the term of this patent is extended or adjusted under 35 U.S.C. 154(b) by 541 days.

This patent is subject to a terminal disclaimer.

(21) Appl. No.: 12/504,964

(22) Filed: Jul. 17, 2009

(65) Prior Publication Data

US 2011/0011683 A1    Jan. 20, 2011

(51) Int. Cl.
*B62L 3/00* (2006.01)

(52) U.S. Cl.
USPC ........................ 188/24.22; 188/344

(58) Field of Classification Search
USPC .......... 188/24.11, 24.12, 24.15, 24.16, 24.22, 188/26, 344

See application file for complete search history.

(56) References Cited

U.S. PATENT DOCUMENTS

| | | | | |
|---|---|---|---|---|
| 1,943,886 | A | * | 1/1934 | Carroll ............................. 60/562 |
| 2,131,613 | A | * | 9/1938 | Chase et al. ................... 188/326 |
| 3,554,334 | A | * | 1/1971 | Shimano et al. ............... 188/344 |
| 3,572,478 | A | * | 3/1971 | Nagel et al. .................... 188/330 |
| 3,610,378 | A | * | 10/1971 | Goddard ........................ 188/345 |
| 3,921,764 | A | * | 11/1975 | Mathauser ................. 188/24.14 |
| 3,993,174 | A | * | 11/1976 | Williams et al. ............... 188/344 |
| 4,015,694 | A | * | 4/1977 | Danko et al. ............... 188/106 A |
| 4,585,094 | A | | 4/1986 | Rottenkolber et al. |
| 4,754,853 | A | | 7/1988 | Nagano |
| 5,368,136 | A | * | 11/1994 | Walte ........................ 188/24.22 |
| 5,443,134 | A | * | 8/1995 | Gajek et al. .................... 188/344 |
| 5,678,665 | A | * | 10/1997 | Debreczeni .................... 188/344 |
| 5,813,501 | A | * | 9/1998 | Terry, Sr. ........................ 188/344 |
| 6,374,957 | B1 | | 4/2002 | Krumbeck et al. |
| 6,651,790 | B2 | * | 11/2003 | Juan ............................... 188/344 |
| 2011/0011684 | A1 | * | 1/2011 | Tetsuka et al. ............. 188/24.22 |
| 2011/0147149 | A1 | * | 6/2011 | Tetsuka et al. ................ 188/344 |
| 2011/0148095 | A1 | * | 6/2011 | Tetsuka et al. ................... 285/62 |
| 2011/0290595 | A1 | * | 12/2011 | Nago ......................... 188/24.22 |

FOREIGN PATENT DOCUMENTS

| | | |
|---|---|---|
| CH | 187572 A | 11/1936 |
| CH | 201940 A | 11/1938 |
| DE | 3303586 A1 | 8/1984 |
| DE | 3325970 A1 | 1/1985 |

(Continued)

OTHER PUBLICATIONS

Machine Translation of EP 0 166 905 obtained from http://gb.espacenet.com.*

(Continued)

*Primary Examiner* — Bradley King
*Assistant Examiner* — Nicholas J Lane
(74) *Attorney, Agent, or Firm* — James A. Deland

(57) ABSTRACT

An apparatus for a bicycle brake comprises a housing with a first piston bore and a second piston bore, a first piston disposed in the first piston bore, a first piston rod attached to the first piston and extending from the first piston toward the outside of the housing for coupling to a first brake arm, and a second piston disposed in the second piston bore. The first piston moves along a first piston axis, and the second piston moves along a second piston axis.

18 Claims, 8 Drawing Sheets

(56) References Cited

FOREIGN PATENT DOCUMENTS

| | | |
|---|---|---|
| DE | 4232598 A1 | 3/1994 |
| DE | 19929678 A1 | 1/2001 |
| EP | 0166905 A1 | 1/1986 |
| EP | 261502 B1 | 3/1988 |
| EP | 575720 A1 | 4/1993 |
| FR | 971062 A | 1/1951 |
| FR | 1012113 A | 7/1952 |
| GB | 700591 | 12/1953 |
| GB | 745061 | 2/1956 |
| JP | 2011102063 A * | 5/2011 |
| WO | 98-58836 A1 | 12/1998 |

OTHER PUBLICATIONS

European Search Report for EP 10000048.8 the European application that corresponds to this application, dated Aug. 18, 2011.

* cited by examiner

HYDRAULIC CALIPER BRAKE FOR A BICYCLE

BACKGROUND OF THE INVENTION

The present invention is directed to bicycle brake devices and, more particularly, to a hydraulic caliper brake for a bicycle.

Bicycles employ many types of brake mechanisms. For example, a typical caliper brake assembly is disclosed in U.S. Pat. No. 4,754,853. A caliper brake typically comprises a pair of brake arms, wherein each brake arm includes a brake arm mounting portion, a brake pad mounting portion and an operating portion. The brake arm mounting portion is disposed between the brake pad coupling portion and the operating portion, and the brake arm mounting portion is pivotably connected to a bicycle frame member such as the front steering fork so that the pair of brake arms are located in close proximity to the front wheel. A brake pad is mounted to the brake pad mounting portion for applying frictional force to the wheel rim, and an operating wire assembly is connected to the operating portion. The operating wire assembly is connected to a control lever assembly mounted to the bicycle handlebar so that the rider may pull and release a control lever to operate the brake mechanism.

Some bicycles substitute a hydraulic operating system for the operating wire assembly. For example, German Offenlegungsschrift No. 3,325,970 discloses a caliper brake wherein a hydraulic cylinder assembly is disposed between the operating portions of a pair of brake arms that support a corresponding pair of brake shoes. The hydraulic cylinder assembly comprises first and second pistons slidably disposed within corresponding first and second opposing bores formed in a housing, wherein the outer end of each piston engages the operating portion of a corresponding brake arm. The first and second bores are in fluid communication with a hydraulic fluid chamber so that the first and second pistons move outwardly in opposite directions when hydraulic fluid is injected into the hydraulic fluid chamber, thereby rotating the brake arms and the brake shoes into their operating positions.

SUMMARY OF THE INVENTION

The present invention is directed to various features of a hydraulic caliper brake for a bicycle. In one embodiment, an apparatus for a bicycle brake comprises a housing with a first piston bore and a second piston bore, a first piston disposed in the first piston bore, a first piston rod attached to the first piston and extending from the first piston toward the outside of the housing for coupling to a first brake arm, and a second piston disposed in the second piston bore. The first piston moves along a first piston axis, and the second piston moves along a second piston axis. Additional inventive features will become apparent from the description below, and such features alone or in combination with the above features and their equivalents may form the basis of further inventions as recited in the claims.

DETAILED DESCRIPTION OF THE EMBODIMENTS

Figure 1:
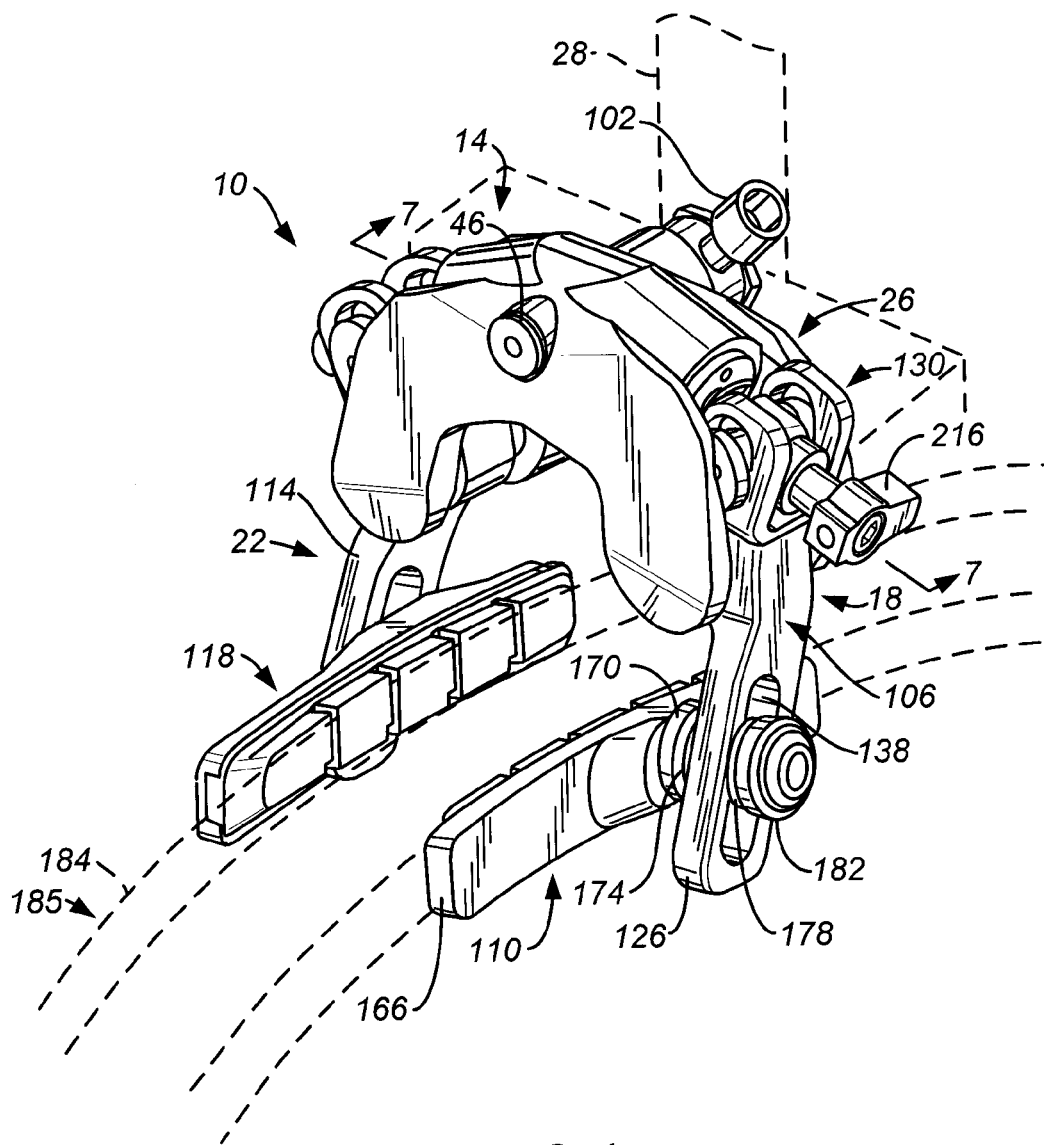
FIG. 1 is a front perspective view of an embodiment of a hydraulic caliper brake for a bicycle.

FIG. 1 is a front perspective view of a hydraulic caliper brake 10 for a bicycle. Caliper brake 10 comprises a caliper housing 14, a first brake arm assembly 18, a second brake arm assembly 22, and an adjustment mechanism 26 that functions in a manner described below. In general, caliper housing 14 is structured to mount to a bicycle frame member 28 (e.g., a front steering fork) so that caliper housing 14, first brake arm assembly 18 and second brake arm assembly 22 may be removed as a unit from bicycle frame member 28.

Figure 2:
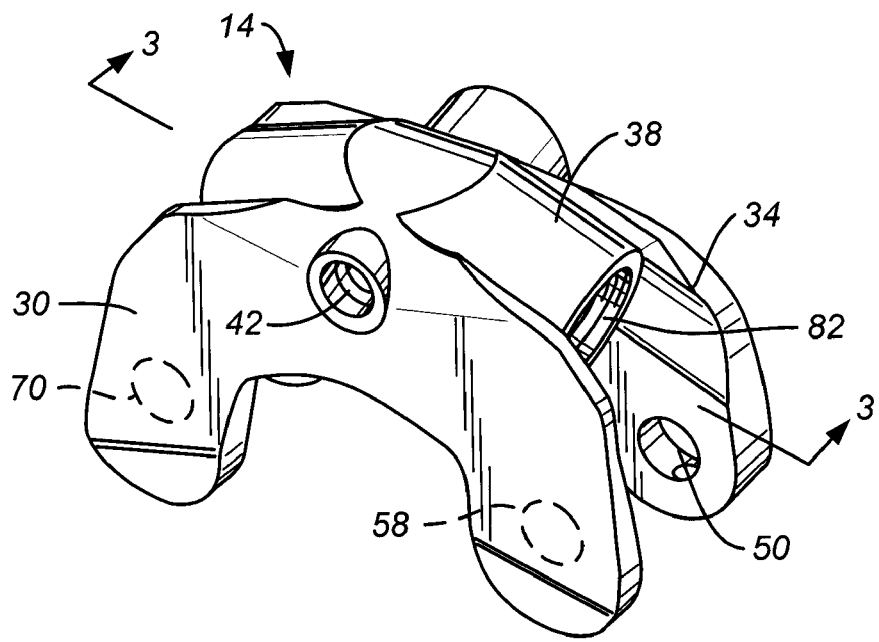
FIG. 2 is front perspective view of the caliper housing.
Figure 3:
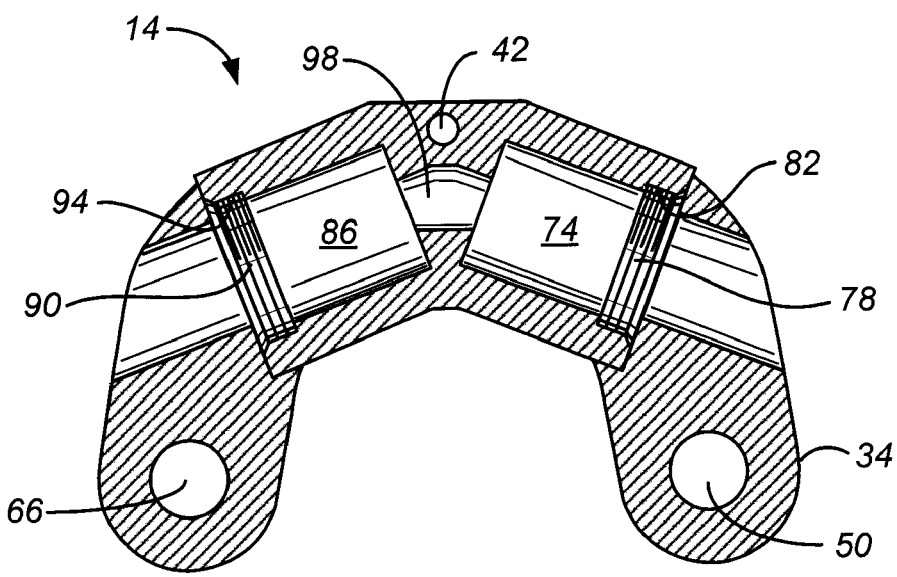
FIG. 3 is a view taken along line 3-3 in FIG. 2.

As shown in FIGS. 2 and 3, caliper housing 14 comprises a front wall 30, a rear wall 34, and a piston housing 38 disposed between front wall 30 and rear wall 34. Caliper housing 14 includes a housing fastener opening 42 configured to receive a housing fastener 46 (FIG. 1) therethrough, a first through bore 50 for receiving a first brake arm fastener 54 (FIG. 5) therethrough, a first threaded blind bore 58 for threadingly engaging a threaded outer peripheral surface 62 of first brake arm fastener 54, a second through bore 66 for receiving a second brake arm fastener 68 (FIG. 7) therethrough, and a second threaded blind bore 70 for threadingly engaging a threaded outer peripheral surface of second brake arm fastener 68. In this embodiment, front wall 30, rear wall 34 and piston housing 38 are formed as one piece. As shown in FIG. 3, caliper housing 14 includes a first piston bore 74, a first retainer bore 78 with a first threaded inner peripheral surface 82, a second piston bore 86, a second retainer bore 90 with a second threaded inner peripheral surface 94, and a hydraulic fluid chamber 98 in fluid communication with first piston bore 74, second piston bore 86, and a hydraulic fluid inlet 102 (FIG. 1).

As shown in FIG. 1, first brake arm assembly 18 comprises a first brake arm 106 and a first brake pad assembly 110, and second brake arm assembly 22 comprises a second brake arm 114 and a second brake pad assembly 118. First brake arm assembly 18 and second brake arm assembly 22 are constructed as mirror images of each other, so only the details of first brake arm assembly 18 will be described in detail.

Figure 4:
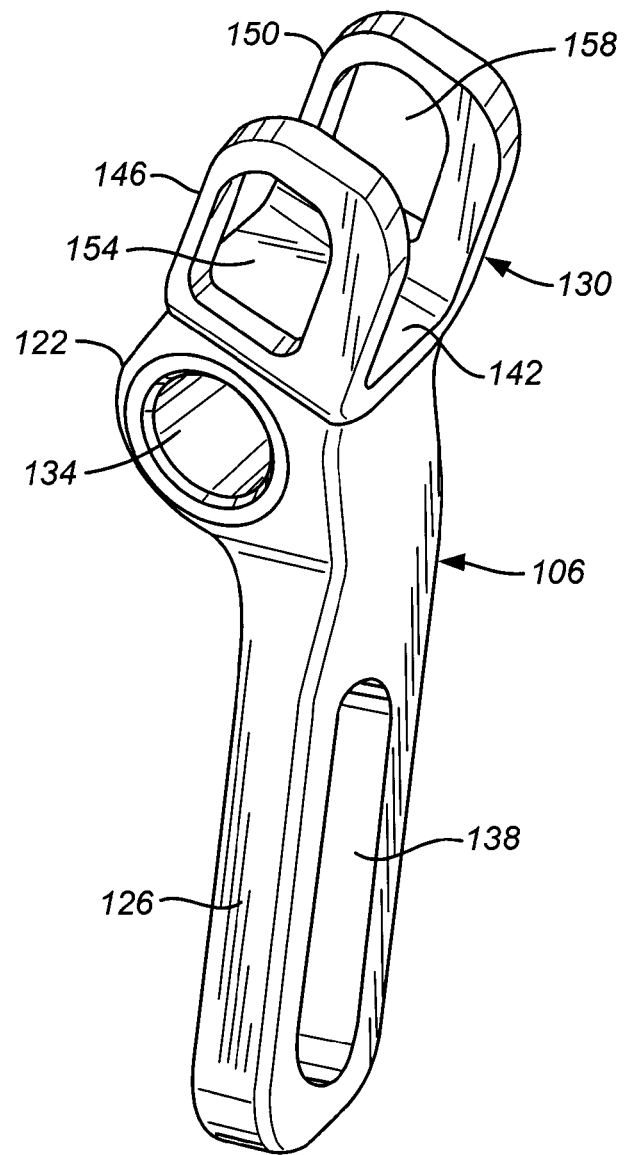
FIG. 4 is a front perspective view of a brake arm.
Figure 5:
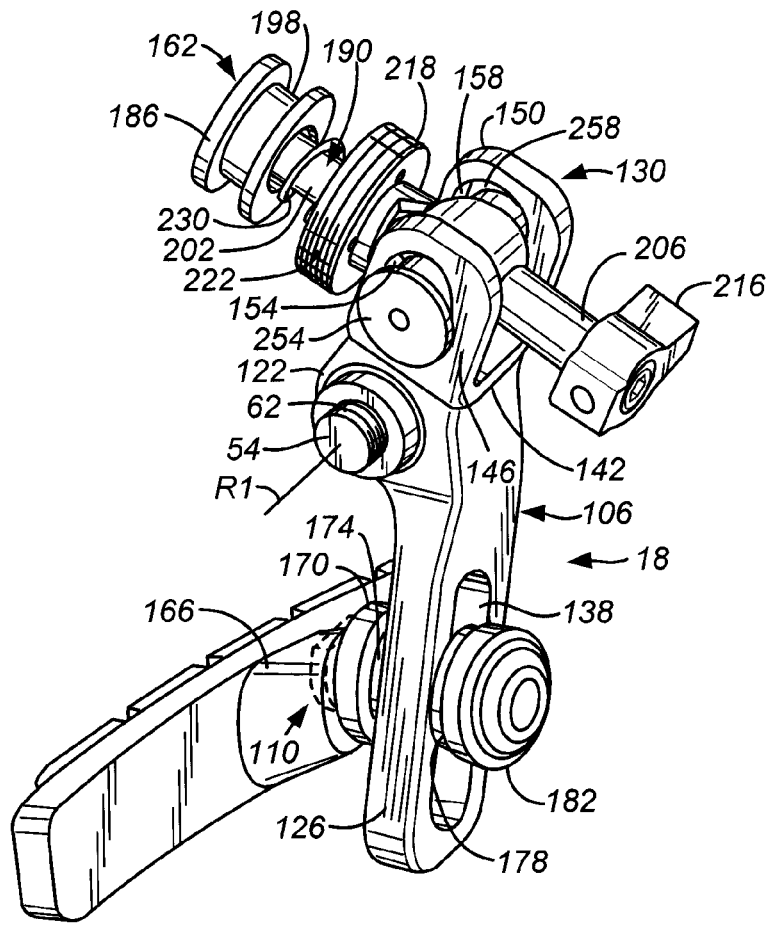
FIG. 5 is a front perspective view of a piston assembly and a brake pad assembly attached to the brake arm.

As shown in FIGS. 4 and 5, first brake arm 106 comprises a first brake arm mounting portion 122, a first brake pad coupling portion 126, and a first piston coupling portion 130, wherein first brake arm mounting portion 122 is disposed between first brake pad coupling portion 126 and first piston coupling portion 130. First brake arm mounting portion 122 includes a first fastener opening 134 configured to receive first brake arm fastener 54 therethrough so that first brake arm 106 is mounted directly to caliper housing 14 using first through bore 50 and first threaded blind bore 58. As a result, first brake arm 106 rotates around a first brake arm rotational axis R1. First brake pad coupling portion 126 is formed as an elongated arm that extends downwardly from first brake arm mounting portion 122. First brake pad coupling portion 126 includes an elongated first brake pad mounting slot 138 for adjustably mounting first brake pad assembly 110. First piston coupling portion 130 is formed as a U-shaped member comprising a bottom wall 142 formed on the top of first brake arm mounting portion 122, a first side wall 146 extending perpendicularly upwardly from bottom wall 142, and a second side wall 150 extending perpendicularly upwardly from bottom wall 142 and parallel to first side wall 146. First side wall 146 includes a first D-shaped opening 154, and second side wall 150 includes a second D-shaped opening 158. First piston coupling portion 130 is used to couple a first piston assembly 162 to first brake arm 106.

First brake pad assembly 110 has a conventional structure comprising a brake pad 166, a brake pad mounting bolt 170 that extends through first brake pad mounting slot 138, an inner washer 174, an outer washer 178, and a fixing nut 182. The vertical position of first brake pad assembly 110 may be adjusted by loosening fixing nut 182, sliding brake pad mounting bolt 170 upwardly or downwardly within first brake pad mounting slot 138 until brake pad 166 is located at the proper position relative to a rim 184 (FIG. 1) of a wheel 185 (FIG. 9), and then tightening fixing nut 182.

Figure 6:
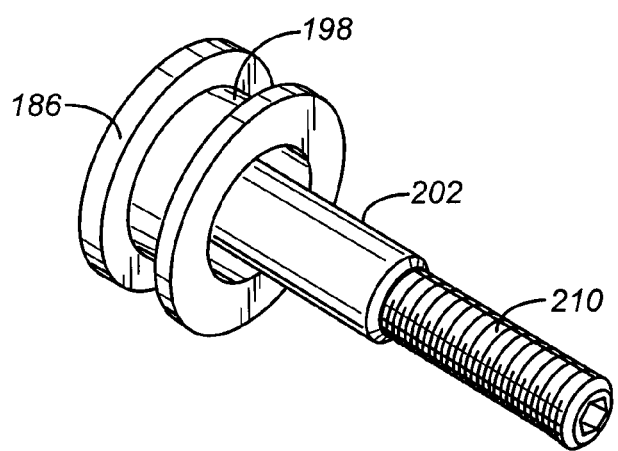
FIG. 6 is a detailed view of the piston.
Figure 7:
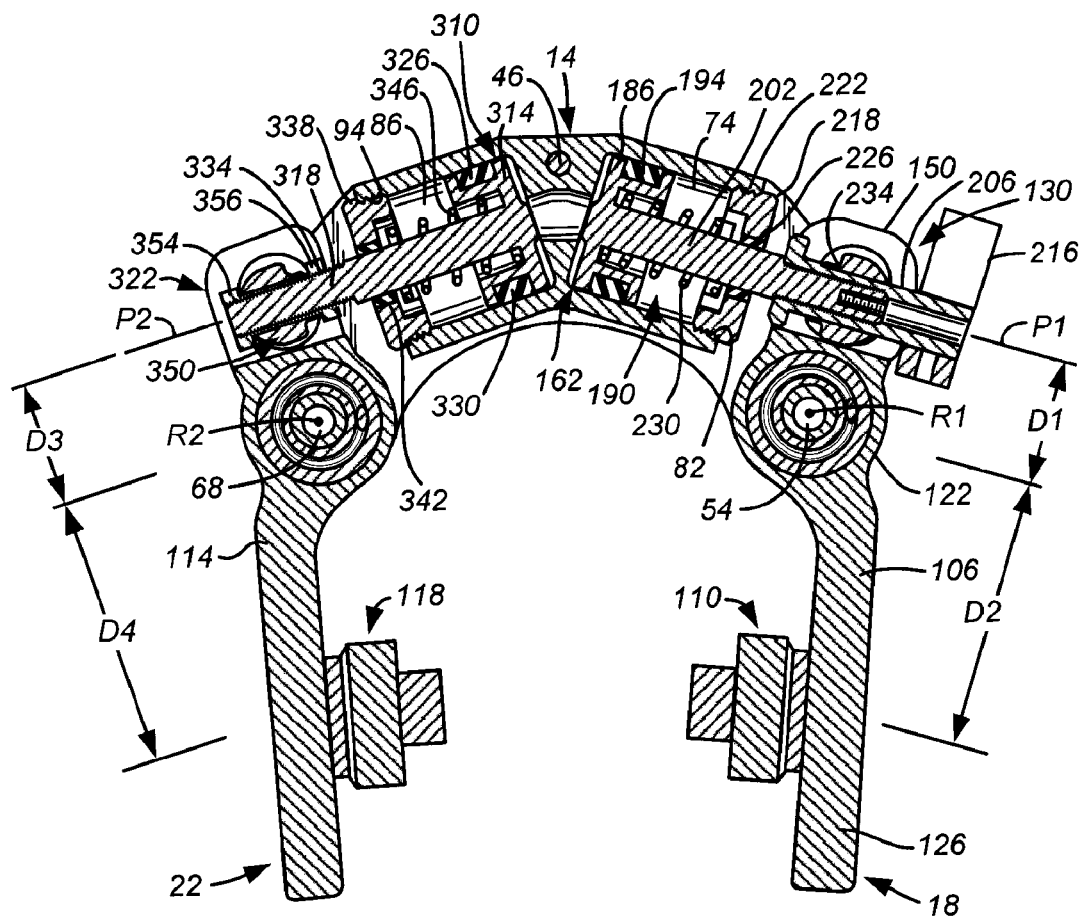
FIG. 7 is a view taken along line 7-7 in FIG. 1.

As shown in FIGS. 5-7, first piston assembly 162 comprises a first piston 186, a multi-piece first piston rod 190 that extends from first piston 186 toward the outside of housing 14 for coupling to first piston coupling portion 130 of first brake arm 106, and an annular seal 194. First piston 186 has a cylindrical shape and is dimensioned to slidably fit within first piston bore 74 for movement along a first piston axis P1. First piston 186 includes an annular seal groove 198 for accommodating annular seal 194 so that annular seal 194 contacts the inner peripheral surface of first bore 74.

First piston rod 190 comprises a first rod section 202 and a second rod section 206. First rod section 202 is fixedly attached to first piston 186 and includes a threaded outer peripheral surface 210. As shown more clearly in FIG. 8C, second rod section 206 includes a threaded inner peripheral surface 214 that threadingly engages threaded outer peripheral surface 210 of first rod section 202 to form a first possible form of adjustment mechanism 26. As a result, a length of first piston rod 190 changes when first rod section 202 turns relative to second rod section 206. An operating member in the form of a lever 216 is formed at the outer end of second rod section 206 so that second rod section 206 may be rotated relative to first rod section 202.

First piston 186 is retained within first piston bore 74 by a first retainer 218. First retainer 218 has a threaded outer peripheral surface 222 that threadingly engages first threaded inner peripheral surface 82 of first retainer bore 78 in caliper housing 14. An annular seal 226 is disposed between the inner peripheral surface of first retainer 218 and the outer peripheral surface of second rod section 206 of first piston rod 190 to prevent contaminants from entering into first piston bore 74. A first piston return spring 230 is disposed between first piston 186 and first retainer 218 to bias first piston 186 toward hydraulic fluid chamber 98 (to the left in FIG. 7).

Figure 8A:
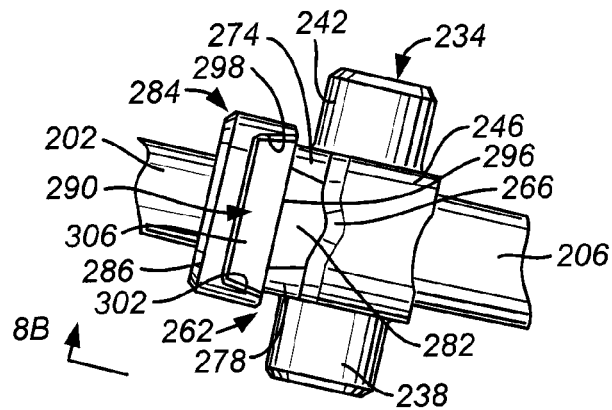
FIG. 8A is a top view of portions of an adjustment mechanism in a first adjustment state.
Figure 8B:
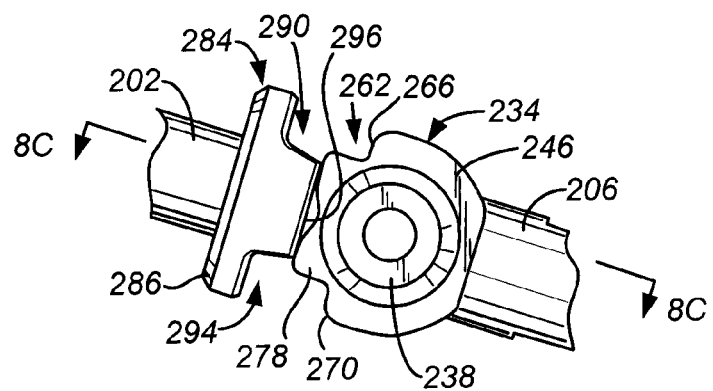
FIG. 8B is a side view of the adjustment mechanism in the first adjustment state.
Figure 8C:
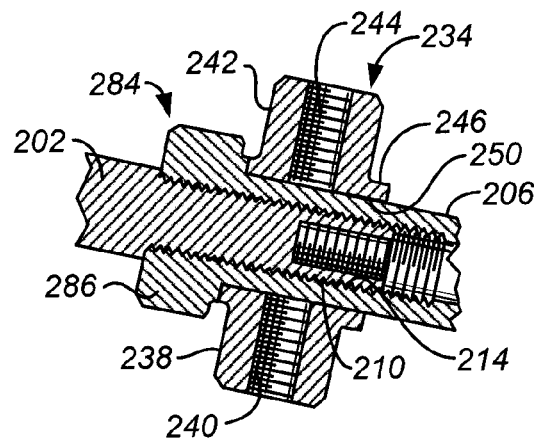
FIG. 8C is a view taken along line 8C-8C of FIG. 8B.

As shown in FIGS. 8A-8C, second rod section 206 of first piston rod 190 is supported by a first bearing 234 that extends generally perpendicularly to second rod section 206. First bearing 234 has the shape of a stepped cylinder comprising a smaller diameter first arm coupling portion 238 with a threaded inner peripheral surface 240, a smaller diameter second arm coupling portion 242 with a threaded inner peripheral surface 244, and a larger diameter central portion 246 with a bore 250 through which second rod section 206 passes. First arm coupling portion 238 is disposed within first D-shaped opening 154 in first side wall 146 of first piston coupling portion 130, and second arm coupling portion 242 is disposed within second D-shaped opening 158 in second side wall 150 of first piston coupling portion 130. As shown in FIG. 5, fasteners in the form of bolts 254 and 258 screw into threaded inner peripheral surfaces 240 and 244 of first arm coupling portion 238 and second arm coupling portion 242, respectively, so that first bearing 234, and hence first piston rod 190, are movably retained to first piston coupling portion 130 of first brake arm 106. As a result, first brake arm 106 rotates around first rotational axis R1 in response to movement of first piston 186. In this embodiment, a distance D1 from first brake arm rotational axis R1 to a location where first piston 186 couples to first brake arm 106 is less than a distance D2 from first brake arm rotational axis R1 to a location where first brake pad assembly 110 couples to first brake arm 106.

As shown in FIGS. 8A and 8B, larger diameter central portion 246 of first bearing 234 has a cutout portion 262 defined by an upper wall portion 266 of larger diameter central portion 246, a lower wall portion 270 of larger diameter central portion 246, a first side wall portion 274 of larger diameter central portion 246, and a second side wall portion 278 of larger diameter central portion 246. As a result of this structure, cutout portion 262 forms a detent recess 282.

In this embodiment, a detent element 284 is formed as one piece with second rod section 206 at the innermost end of second rod section 206 as shown in FIG. 8C. As shown in FIG. 8B, detent element 284 comprises a cylindrical body member 286 with a first detent recess 290, a second detent recess 294, and an outer abutment 296. As shown in FIG. 8A, first detent recess 290 includes an inclined first cam wall 298, an inclined second cam wall 302, and a bottom floor 306. Second detent recess 294 has a similar structure. When detent element 284 is in the position shown in FIG. 8A, outer abutment 296 abuts against first side wall portion 274 and second side wall portion 278 of first bearing 234. Detent recess 282 in first bearing 234 and outer abutment 296 in detent element 284 form a second possible form of adjustment mechanism 26.

As shown in FIG. 7, a second piston assembly 310 comprises a second piston 314, a second piston rod 318 that extends from second piston 314 toward the outside of housing 14 for coupling to a second piston coupling portion 322 of second brake arm 114, and an annular seal 326. As with first piston 186, second piston 314 has a cylindrical shape and is dimensioned to slidably fit within second piston bore 86 for movement along a second piston axis P2, wherein second piston axis P2 is inclined relative to first piston axis P1, and housing fastener 46 is perpendicular to both first piston axis P1 and second piston axis P2. Second piston 314 also includes an annular seal groove 330 for accommodating annular seal 326 so that annular seal 326 contacts the inner peripheral surface of second bore 86. Second piston rod 318 is fixedly attached to second piston 314 and includes a threaded outer peripheral surface 334 at the distal end thereof.

Second piston 314 is retained within second piston bore 86 by a second retainer 338 that has the same structure as first retainer 218 and threadingly engages second threaded inner peripheral surface 94 of second retainer bore 90 in caliper housing 14. An annular seal 342 is disposed between the inner peripheral surface of second retainer 338 and the outer peripheral surface of second piston rod 318 to prevent contaminants from entering into second piston bore 86. A second piston return spring 346 is disposed between second piston 314 and second retainer 338 to bias second piston 314 toward hydraulic fluid chamber 98 (to the right in FIG. 7).

Second piston rod 318 is supported by a second bearing 350 that extends generally perpendicularly to second piston rod 318. Nuts 354 and 356 are screwed onto threaded outer peripheral surface 334 of second piston rod 318 on opposite sides of second bearing 350 to axially retain second piston rod 318 to second bearing 350. Second bearing 350 has the shape of a stepped cylinder with a through-bore similar to first bearing 234. Fasteners in the form of bolts (not shown) screw into the smaller diameter portions of second bearing 350 so that second bearing 350, and hence second piston rod 318, are movably retained to second piston coupling portion 322 of second brake arm 114. As a result, second brake arm 114 rotates around second rotational axis R2 in response to movement of second piston 314. As with first brake arm assembly 18, a distance D3 from second brake arm rotational axis R2 to a location where second piston 314 couples to second brake arm 114 is less than a distance D4 from second brake arm rotational axis R2 to a location where second brake pad assembly 118 couples to second brake arm 114.

Figure 9:
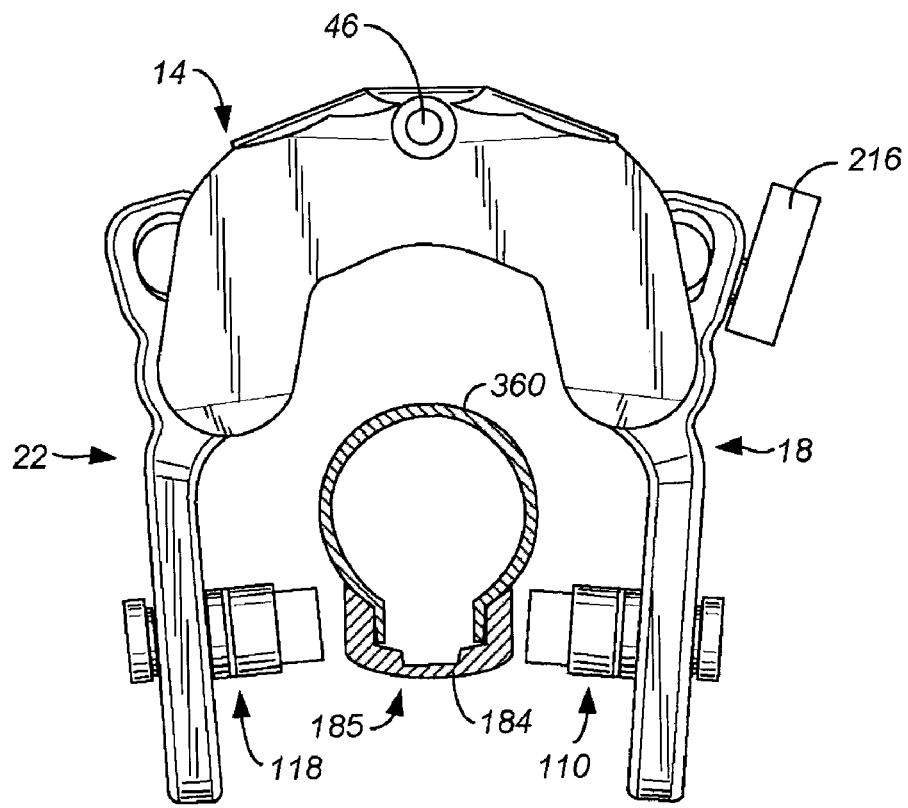
FIG. 9 is a front view of the caliper brake when the adjustment mechanism is in the first state shown in FIGS. 8A-8C.

When lever 216 is in the position shown in FIG. 7, detent element 284 is in the position shown in FIGS. 8A and 8B, first and second pistons 186 and 314 are in the positions shown in FIG. 7, and first and second brake arms 106 and 114, together with first and second brake pad assemblies 110 and 118, are in the normal operating positions shown in FIG. 9. When caliper brake 10 is in this state, the space between first and second brake pad assemblies 110 and 118 may be too small to clear a tire 360 of wheel 185.

Figure 10A:
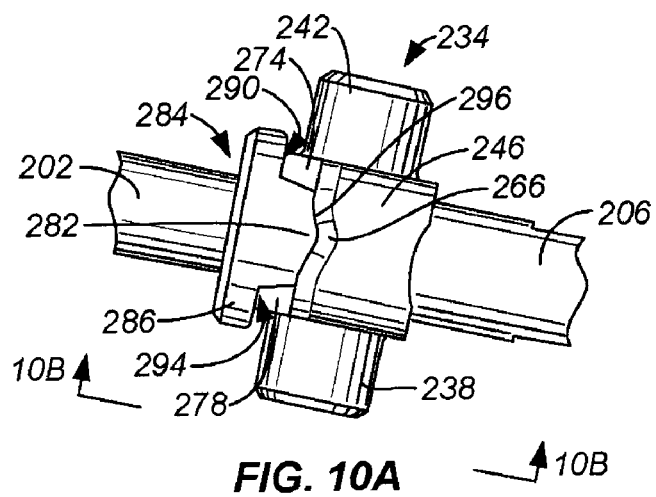
FIG. 10A is a top view of portions of the adjustment mechanism in a second adjustment state.
Figure 10B:
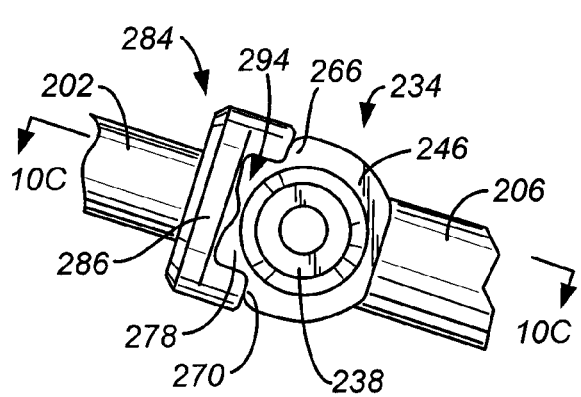
FIG. 10B is a side view of the adjustment mechanism in the second adjustment state.
Figure 10C:
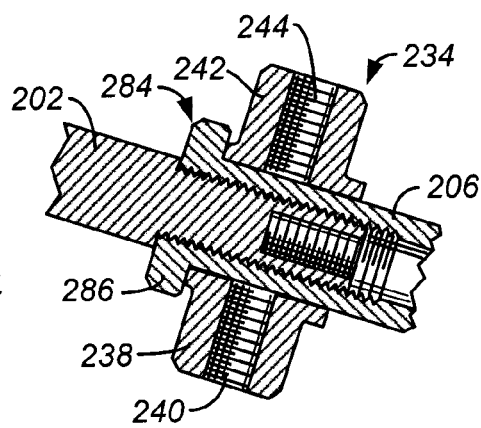
FIG. 10C is a view taken along line 10C-10C of FIG. 10B.
Figure 11:
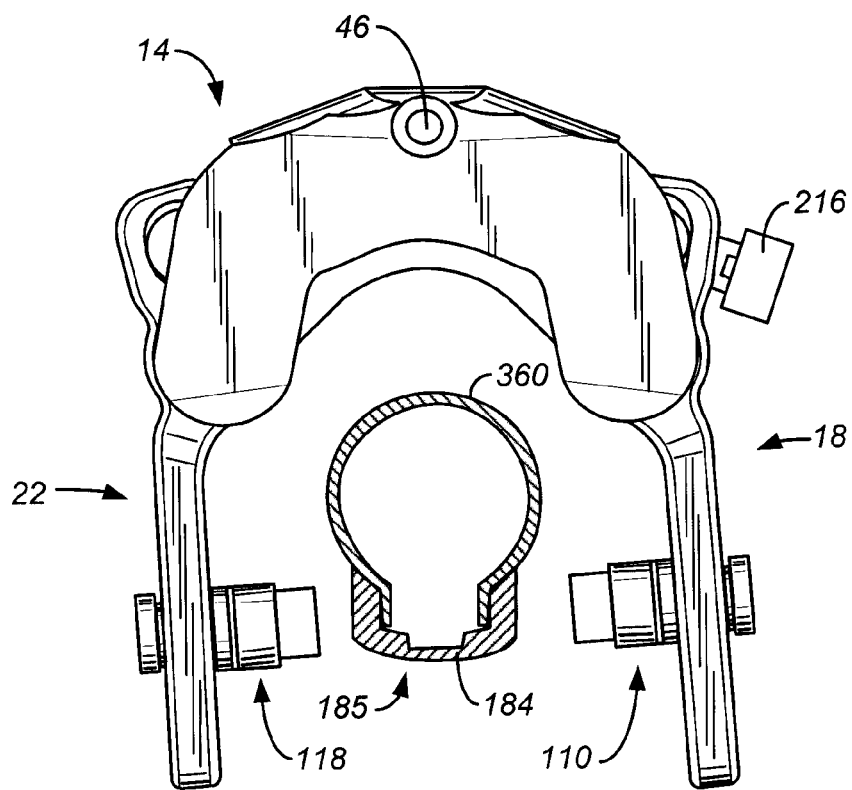
FIG. 11 is a front view of the caliper brake when the adjustment mechanism is in the second state shown in FIGS. 10A-10C.

In order to allow wheel 185 to be removed, lever 216 is rotated 90° clockwise to the position shown in FIG. 11. As a result, detent element 284 is rotated to the position shown in FIGS. 10A-10C so that first side wall portion 274 of first bearing 234 enters first detent recess 290 of detent element 284, second side wall portion 278 of first bearing 234 enters second detent recess 294 of detent element 284, and outer abutment 296 of detent element 284 enters detent recess 282 in first bearing 234. At the same time, first rod section 202 of first piston rod 190 screws into second rod section 206 of first piston rod 190 to shorten the length of first piston rod 190. As a result, first and second brake arms 106 and 114, together with first and second brake pad assemblies 110 and 118, assume the positions shown in FIG. 11. The space between first and second brake pad assemblies 110 and 118 now is large enough to allow removal of wheel 185. Furthermore, since the space between first brake pad assembly 110 and second brake pad assembly 118 is widened by shortening the length of first piston rod 190 rather than by forcing first piston 186 further into first piston bore 74, hydraulic fluid is not forced out of hydraulic fluid chamber 98, and it is not necessary to repetitively operate the brake control mechanism in order to restore equilibrium between first piston 186 and second piston 314.

While the above is a description of various embodiments of inventive features, further modifications may be employed without departing from the spirit and scope of the present invention. For example, the size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. Thus, the scope of the invention should not be limited by the specific structures disclosed or the apparent initial focus or emphasis on a particular structure or feature.

What is claimed is:

1. An apparatus for a bicycle brake comprising:
  a housing with a first piston bore and a second piston bore, wherein the housing includes a housing fastener opening configured to receive a housing fastener therethrough to mount the housing to a bicycle frame member;
  a first piston disposed in the first piston bore;
  a first piston rod attached to the first piston and extending from the first piston toward the outside of the housing;
  wherein the first piston moves along a first piston axis;
  a second piston disposed in the second piston bore;
  wherein the second piston moves along a second piston axis;
  wherein the first piston axis is inclined relative to the second piston axis;
  wherein the first piston bore overlaps the housing fastener opening when viewed along the first piston axis;
  wherein the second piston bore overlaps the housing fastener opening when viewed along the second piston axis;
  wherein the housing includes:
    a front wall; and
    a rear wall;
    wherein the front wall includes:
      a first front wall brake arm mounting location for pivotably mounting a first brake arm mounting portion of a first brake arm; and
      a second front wall brake arm mounting location for pivotably mounting a second brake arm mounting portion of a second brake arm;
    wherein the rear wall includes:
      a first rear wall brake arm mounting location for pivotably mounting the first brake arm mounting portion of the first brake arm; and
      a second rear wall brake arm mounting location for pivotably mounting the second brake arm mounting portion of the second brake arm;
    wherein the front wall and the rear wall overlap the first brake arm mounting portion of the first brake arm when the first brake arm is mounted to the housing and when viewed perpendicular to the first piston axis so that the housing straddles the first brake arm mounting portion; and
    wherein the front wall and the rear wall overlap the second brake arm mounting portion of the second brake arm when the second brake arm is mounted to the housing and when viewed perpendicular to the second piston axis so that the housing straddles the second brake arm mounting portion.

2. The apparatus according to claim 1 further comprising:
  the first brake arm, wherein the first brake arm includes a first piston coupling portion operatively coupled to the first piston rod for moving in response to movement of the first piston, and wherein the first brake arm includes the first brake arm mounting portion mounted between the first front wall brake arm mounting portion of the front wall and the first rear wall brake arm mounting portion of the rear wall; and the second brake arm, wherein the second brake arm includes a second piston coupling portion operatively coupled to the second piston for moving in response to movement of the second piston, and wherein the second brake arm includes the second brake arm mounting portion mounted between the second front wall brake arm mounting portion of the front wall and the second rear wall brake arm mounting portion of the rear wall.

3. The apparatus according to claim 2 wherein the first brake arm mounting portion is configured to mount the first brake arm directly to the housing, and wherein the second brake arm mounting portion is configured to mount the second brake arm directly to the housing.

4. The apparatus according to claim 3 wherein the first brake arm mounting portion includes a first fastener opening configured to receive a first fastener therethrough to pivotably mount the first brake arm to the housing, and wherein the second brake arm mounting portion includes a second fastener opening configured to receive a second fastener therethrough to pivotably mount the second brake arm to the housing.

5. The apparatus according to claim 4 wherein the housing fastener opening is configured to receive the housing fastener therethrough so that the housing fastener extends generally perpendicular to the first piston axis and to the second piston axis.

6. The apparatus according to claim 3 wherein the first brake arm includes a first brake pad coupling portion, wherein the first brake arm mounting portion is located between the first piston coupling portion and the first brake pad coupling portion, and wherein the second brake arm includes a second brake pad coupling portion, wherein the second brake arm mounting portion is located between the second piston coupling portion and the second brake pad coupling portion.

7. The apparatus according to claim 6 wherein the first brake arm rotates around a first brake arm rotational axis at the first brake arm mounting portion, wherein the second brake arm rotates around a second brake arm rotational axis at the second brake arm mounting portion, wherein a distance from the first brake arm rotational axis to a location where the first piston couples to the first brake arm is less than a distance from the first brake arm rotational axis to a location where a first brake pad couples to the first brake arm, and wherein a distance from the second brake arm rotational axis to a location where the second piston couples to the second brake arm is less than a distance from the second brake arm rotational axis to a location where a second brake pad couples to the second brake arm.

8. The apparatus according to claim 6 further comprising an adjustment mechanism that adjusts a distance of the first piston coupling portion relative to the first piston.

9. The apparatus according to claim 8 further comprising a first bearing coupled to the first piston rod and to the first piston coupling portion so that the first piston rod moves relative to the first brake arm.

10. The apparatus according to claim 9 wherein the first bearing extends generally perpendicularly to the first piston rod to engage the first piston coupling portion.

11. The apparatus according to claim 9 wherein the first piston rod comprises:
a first rod section fixedly attached to the first piston; and
a second rod section supported by the first bearing;
wherein the first rod section moves relative to the second rod section so that a length of the first piston rod changes when the first rod section moves relative to the second rod section.

12. The apparatus according to claim 11 wherein the first rod section threadingly engages the second rod section so that the length of the first piston rod changes when the first rod section turns relative to the second rod section.

13. The apparatus according to claim 12 further comprising a detent element that rotates together with one of the first rod section or the second rod section to selectively maintain the position of the first rod section relative to the second rod section.

14. The apparatus according to claim 13 wherein the detent element engages the first bearing to selectively maintain the position of the first rod section relative to the second rod section.

15. The apparatus according to claim 1 wherein the first piston moves away from the second piston when hydraulic pressure is applied to the first piston bore and to the second piston bore.

16. The apparatus according to claim 1 wherein the housing is a continuous one piece housing.

17. The apparatus according to claim 5 wherein the housing fastener opening is disposed between the first piston bore and the second piston bore.

18. The apparatus according to claim 2 wherein the housing is structured to mount to the bicycle frame member so that the housing, the first brake arm and the second brake arm may be removed as a unit from the bicycle frame member.

* * * * *